United States Patent [19]

Ma et al.

[11] Patent Number: 5,714,548
[45] Date of Patent: Feb. 3, 1998

[54] MULTI-ARM BLOCK COPOLYMER, AND PRESSURE SENSITIVE ADHESIVE AND TAPE EMPLOYING A MULTI-ARM ELASTOMERIC BLOCK COPOLYMER

[75] Inventors: Jingjing Ma; Mark Kevin Nestegard, both of Woodbury, Minn.

[73] Assignee: Minnesota Mining and Manufacturing Company, St. Paul, Minn.

[21] Appl. No.: 573,566

[22] Filed: Dec. 15, 1995

Related U.S. Application Data

[62] Division of Ser. No. 66,860, May 23, 1993, Pat. No. 5,412,031.

[51] Int. Cl.$^6$ ............................................. C08F 297/04
[52] U.S. Cl. ........................... 525/314; 525/98; 525/316
[58] Field of Search .................................. 525/314, 316, 525/98

[56] References Cited

U.S. PATENT DOCUMENTS

| | | | |
|---|---|---|---|
| 3,280,084 | 10/1966 | Zelinski | 525/98 |
| 3,485,894 | 12/1969 | Porter | 525/314 |
| 3,949,020 | 4/1976 | Prudence | 525/314 |
| 3,985,830 | 10/1976 | Fetters | 525/153 |
| 4,091,053 | 5/1978 | Kitchen | 260/880 |
| 4,092,375 | 5/1978 | Vreugdenhil | 260/876 B |
| 4,133,731 | 1/1979 | Hansen et al. | 204/159.17 |
| 4,152,370 | 5/1979 | Moczygemba | 260/880 |
| 4,163,764 | 8/1979 | Nash | 525/2 |
| 4,163,765 | 8/1979 | Moczygemba | 525/314 |
| 4,180,530 | 12/1979 | Bi et al. | 525/98 |
| 4,183,705 | 1/1980 | Birkholz et al. | 428/343 |
| 4,221,884 | 9/1980 | Bi et al. | 525/314 |
| 4,248,980 | 2/1981 | Bi et al. | 525/271 |
| 4,248,981 | 2/1981 | Milkovich et al. | 525/271 |
| 4,248,982 | 2/1981 | Bi et al. | 525/271 |
| 4,248,983 | 2/1981 | Bi et al. | 525/314 |
| 4,248,984 | 2/1981 | Bi et al. | 525/314 |
| 4,267,284 | 5/1981 | Kitchen | 525/99 |
| 4,288,480 | 9/1981 | Grzywynski et al. | 428/40 |
| 4,320,188 | 3/1982 | Heinz et al. | 430/281 |
| 4,346,193 | 8/1982 | Warfel | 525/52 |
| 4,346,198 | 8/1982 | Doak et al. | 525/314 |
| 4,390,663 | 6/1983 | Nicholson et al. | 525/53 |
| 4,391,949 | 7/1983 | St. Clair | 525/99 |
| 4,403,074 | 9/1983 | Moczygemba | 525/386 |
| 4,418,180 | 11/1983 | Heinz | 525/314 |
| 4,430,417 | 2/1984 | Heinz et al. | 430/286 |
| 4,444,953 | 4/1984 | St. Clair | 525/98 |
| 4,460,364 | 7/1984 | Chen et al. | 604/387 |
| 4,480,006 | 10/1984 | Mikovich | 524/534 |
| 4,485,210 | 11/1984 | Neiditch | 525/53 |
| 4,556,464 | 12/1985 | St. Clair | 204/159.15 |
| 4,780,367 | 10/1988 | Lau | 525/314 |
| 4,849,481 | 7/1989 | Rhodes et al. | 525/314 |
| 4,925,899 | 5/1990 | Rendina et al. | 525/314 |
| 4,959,412 | 9/1990 | Arter et al. | 525/98 |
| 5,024,667 | 6/1991 | Malcolm et al. | 604/382 |
| 5,028,646 | 7/1991 | Miller et al. | 524/77 |
| 5,047,484 | 9/1991 | Tung | 525/314 |
| 5,057,571 | 10/1991 | Malcolm et al. | 524/505 |
| 5,061,758 | 10/1991 | Hellermann et al. | 525/193 |
| 5,066,728 | 11/1991 | Audett | 525/314 |
| 5,104,921 | 4/1992 | Erickson et al. | 524/274 |
| 5,112,889 | 5/1992 | Miller et al. | 524/77 |
| 5,130,377 | 7/1992 | Trepka | 525/314 |
| 5,147,939 | 9/1992 | Hellermann et al. | 525/314 |
| 5,395,894 | 3/1995 | Custro | 525/314 |

FOREIGN PATENT DOCUMENTS

| | | |
|---|---|---|
| A-0 471 998 | 2/1992 | European Pat. Off. |
| 4-246488 | 9/1992 | Japan ............. C09J 153/02 |
| WO 91/13935 | 9/1991 | WIPO . |

OTHER PUBLICATIONS

D.C.Allport et al, "Block Copolymers", Applied Science Publisher, London, 1973, pp. 83–85.

*Primary Examiner*—Irina S. Zemel

[57] ABSTRACT

The present invention provides a novel multi-arm block copolymer, a novel pressure-sensitive adhesive made from a multi-arm elastomeric block copolymer, and a novel tape made therefrom. The multi-arm block copolymer has the general structure $(A\text{--}B)_m Y(C\text{--}D)_n$ wherein A, B, C and D are polymer segments; Y is a residue of a multifunctional coupling agent; and m and n are the number of arms, where m and n are greater than 0 and the sum of m plus n is at least 3. A comprises a random copolymer of a monoalkenylarene and a conjugated diene; B and C comprise either a homopolymer of a conjugated diene or a polymer of two or more conjugated dienes; D comprises either a homopolymer of a monoalkenylarene or a copolymer of a monoalkenylarene and a conjugated diene wherein the Tg of D is greater than the Tg of A; and the weight percent of monoalkenylarene in the block copolymer is 40% or less. The pressure-sensitive adhesive of the invention comprises 100 parts by weight of either the previously described multi-arm block copolymer or a multi-arm block copolymer having the structure $(A'\text{--}B)_m Y$, about 20 to about 300 parts by weight of a tackifying resin, 0 to about 50 parts by weight of a crosslinking agent, and 0 to about 200 parts by weight of a plasticizer.

12 Claims, 1 Drawing Sheet

MULTI-ARM BLOCK COPOLYMER, AND PRESSURE SENSITIVE ADHESIVE AND TAPE EMPLOYING A MULTI-ARM ELASTOMERIC BLOCK COPOLYMER

This is a division of application Ser. No. 08/066,860 filed May 23, 1993, now U.S. Pat. No. 5,412,031.

FIELD OF THE INVENTION

The present invention is directed to a multi-arm block copolymer, a pressure sensitive adhesive formulated from a multi-arm elastomeric block copolymer, and tape prepared from the adhesive.

BACKGROUND

Pressure sensitive adhesives that are appropriate for use in removable tape applications require a fourfold balance of peel, tack, adhesion, and resistance to low stress peel. Especially important is the balance between adhesion and resistance to low stress peel.

Masking tapes provide one example of a removable tape. Masking tapes are often used in the automotive industry to mask surfaces during painting. Typically, a masking tape is applied to a surface, exposed to elevated temperature and/or a chemical environment that often includes organic solvent, and removed when the tape user has finished the task. The tape must be easy to apply, stay in place without lifting or curling under conditions of high temperature and chemical environment, and remove cleanly and easily without breaking, damaging the surface, or leaving adhesive residue.

Pressure sensitive adhesives based on non-thermoplastic hydrocarbon elastomers such as natural rubber may be readily formulated to provide an adhesive that meets the requirements of a masking tape. The dominant means of processing such adhesives involves dissolving the elastomer and other adhesive components in a hydrocarbon solvent, coating the solution onto a backing, and drying the coated product to remove the solvent. These solvent-based processes have become increasingly undesirable, however, because of the environmental and safety considerations associated with the use of solvents.

Environmental and safety considerations have led to accelerated interest in the use of hot melt extrusion coating of adhesive compositions. The elastomers typically employed in this technique are "thermoplastic" elastomers of the block copolymer type, including, for example, styrene-isoprene block copolymers.

Although adhesives based on thermoplastic elastomers eliminate the need for solvent-based processing, their adhesive properties are different than those of adhesives based on non-thermoplastic elastomers, and they are not suitable for some applications. For example, conventional star monoalkenylarene/conjugated diene block copolymers (such as star styrene-isoprene-styrene (SIS) block copolymers) are generally not suitable for the formulation of removable adhesives. When formulated to give adhesion in the range desirable for a removable tape, the adhesive lacks the strength to prevent lifting, and the peel and unwind are often not smooth. When formulated to have sufficient strength to prevent lifting, the adhesion is too high, and the tape is difficult to remove.

Patent literature discloses a wide variety of block copolymer structures which are useful in the formulation of adhesives. For example, St. Clair (U.S. Pat. No. 4,391,949) discloses and claims a block copolymer having the structure $(A-B)_x Y(C)_z$ wherein A is a poly(monoalkenyl) block, B and C are poly(conjugated diene) blocks, Y is a residue of multifunctional coupling agent, and x plus z is greater than 6. St. Clair (U.S. Pat. No. 4,444,953) discloses and claims an adhesive composition comprising the block copolymer described in U.S. Pat. No. 4,391,949. Hansen (U.S. Pat. No. 4,133,731) discloses and claims that the block copolymer in a pressure sensitive adhesive can be chemically crosslinked by including a multifunctional acrylate or methacrylate crosslinking agent in the pressure sensitive adhesive formulation and exposing the adhesive to high energy radiation such as electron beam or ultraviolet radiation. Erickson (U.S. Pat. No. 5,104,921) discloses a cured adhesive composition prepared by high energy ionizing radiation initiated curing of a polymer composition comprising an alkenylarene/conjugated diene block copolymer and an oligomer such that the unsaturation index of the composition is minimized. The radiation initiated curing of the adhesive is accomplished without requiring the aid of a coupling agent to promote crosslinking of the block copolymer during exposure to the radiation. Heinz (U.S. Pat. No. 4,430,417) discloses a photopolymerizable mixture of one or more block copolymers which are solely elastomeric and comprise two or more elastomeric polymer blocks having a glass transition temperature (Tg) of from −20° C. to 15° C., linked by one or more elastomeric polymer blocks having a glass transition temperature of below −20° C. Lau (U.S. Pat. No. 4,780,367) discloses a pressure sensitive adhesive composition comprising a star block copolymer having the general structure $(A-B)_n C$ wherein A is a terminal polymeric block consisting essentially of polymerized monovinyl aromatic monomer having 8 to 18 carbon atoms and selected from the group consisting of styrene and alkylated styrene; B represents a polymeric block consisting essentially of polymerized conjugated diene monomer having 4 to 12 carbon atoms; C represents the residue of a polyvinyl aromatic compound providing a nucleus which links together the arms of the star block copolymer; and the number of arms, represented by n, is at least 12.

St. Clair (U.S. Pat. No. 4,556,464) discloses pressure-sensitive adhesives made with ABA star block copolymers wherein the endblock (1) is a random copolymer of a monoalkenylarene and a conjugated diene and (2) has a Tg between 19° C. and 100° C. The copolymer endblock includes a diene in order to introduce a reactive site into the endblock for crosslinking. St. Clair shows that tack loss can be improved by adding a crosslinking additive that is mainly compatible with the endblock phase to preferentially promote crosslinking in the endblock over the midblock.

The present invention provides a novel multi-arm block copolymer, particularly useful in the formulation of a pressure sensitive adhesive. The adhesive of the invention can be hot melt extrusion coated to provide a variety of different types of tapes, especially removable tapes having sufficient resistance to low stress peel while maintaining moderate peel adhesion. Such tapes may be used as masking tapes, packaging tapes, medical tapes and autoclave indicator tapes. Additionally, the pressure sensitive adhesive may be used to make adhesive-backed protective sheeting, labels, and facestock.

SUMMARY OF THE INVENTION

In accordance with one aspect of the present invention, there is provided a novel multi-arm block copolymer, and both a novel pressure-sensitive adhesive and a novel tape made therewith. The novel multi-arm block copolymer has the general structure $$(A-B)_m Y(C-D)_n \quad \text{(Formula I)}$$

wherein A, B, C and D are polymer segments; Y is a residue of a multifunctional coupling agent; m is the number of A—B polymer segment arms; n is the number of C—D polymer segment arms; m and n are both greater than 0; and the sum of m plus n is at least 3. Segment A comprises a random copolymer of a monoalkenylarene and a conjugated diene; B and C may be the same or different and comprise either a homopolymer of a conjugated diene or a polymer of two or more conjugated dienes; D comprises either a homopolymer of a monoalkenylarene or a copolymer of a monoalkenylarene and a conjugated diene. The glass transition temperature Tg of D is greater than the Tg of A. The total weight percent of monoalkenylarene in the block copolymer is 40% or less. Preferably the novel multi-arm block copolymer is elastomeric.

The pressure sensitive adhesive based upon the Formula I block copolymer comprises 100 parts by weight of the novel multi-arm elastomeric block copolymer, about 20 to about 300 parts by weight of a tackifying resin, 0 to about 50 parts by weight of a crosslinking agent, and 0 to about 200 parts by weight of a plasticizer.

In another aspect of the present invention, there is provided a pressure sensitive adhesive and a pressure sensitive adhesive tape based upon a multiarm elastomeric block copolymer of the general structure $$(A'-B)_m Y \quad \text{(Formula II)}$$

In this embodiment the pressure sensitive adhesive comprises 100 parts by weight of the Formula II copolymer, about 20 to about 300 parts by weight of a tackifying resin, 0 to about 50 parts by weight of a crosslinking agent, and 0 to about 200 parts by weight of a plasticizer. In the $(A'-B)_m Y$ structure, A' and B are polymer segments, Y is a residue of a multifunctional coupling agent, and m represents the number of arms and is at least three. Segment A' comprises a random copolymer of a monoalkenylarene and a conjugated diene, wherein the Tg of A' is less than 19° C., and B comprises either a homopolymer of a conjugated diene or polymer of two or more conjugated dienes.

Applicants have discovered the surprising result that by controlling the Tg of the A or A' segment of the multi-arm block copolymer to a sufficiently low level, a pressure sensitive adhesive tape having a good balance of resistance to low stress peel and peel adhesion is achieved. Accordingly, the adhesive of the present invention, and tape made from it, (1) resist lifting under light loads and (2) maintain moderate peel adhesion thereby remaining easy to remove. In addition, the adhesive may be chemically crosslinked to achieve high temperature cohesive strength and solvent resistance without significantly altering characteristics (1) and (2).

The tape of the invention comprises a layer of the pressure sensitive adhesive on one or both surfaces of a carrier. The carrier may comprise paper, polymer or any other suitable material. The carrier may also comprise a release surface so that the adhesive coated thereon may be utilized as a transfer tape. The tape is especially useful for masking tape applications but may also be useful in other applications including packaging tapes, and autoclave indicator tapes. The adhesive may also be used to provide tape that withstands a variety of temperatures and chemical environments.

DETAILED DESCRIPTION

Figure 1:
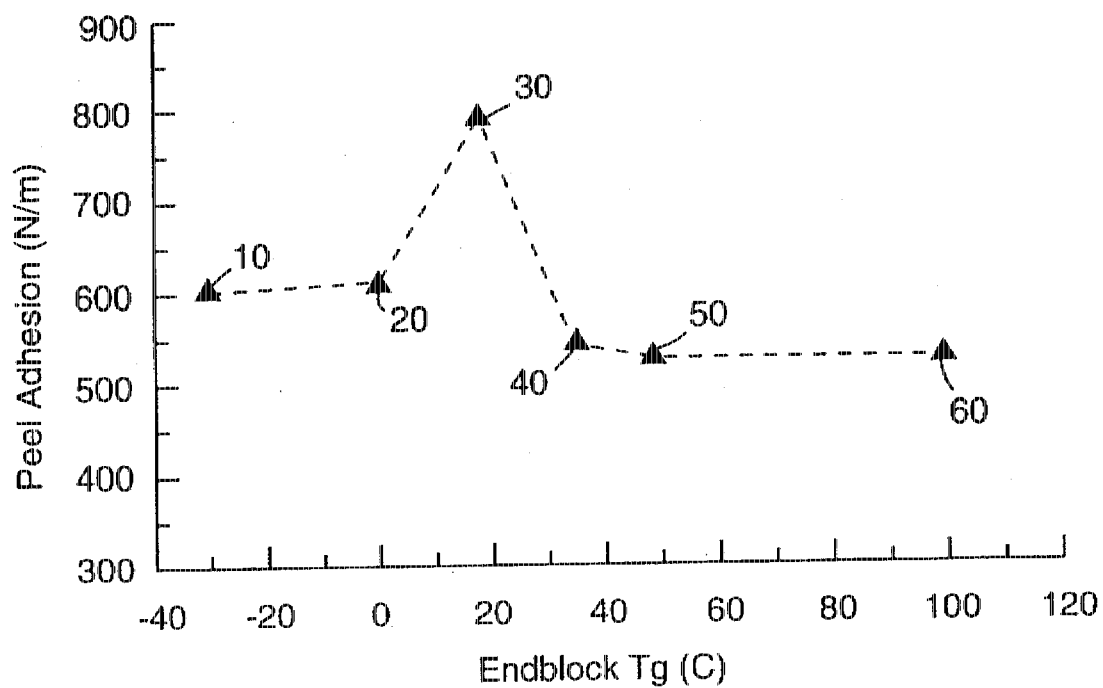
FIG. 1 is a plot of Peel Adhesion versus Endblock Tg of the multi-arm block copolymer.

The general structure of the novel block copolymer of the present invention is $(A-B)_m Y(C-D)_n$, wherein polymer segments A and D are endblocks and polymer segments B and C are midblocks. All polymer segments may be present as separate phases except in the special case where B and C comprise the same homopolymer. Each of the arms of the block copolymer are represented by the segments (A—B)— and (C—D)— which are also referred to as riblocks when not connected to Y. The number of arms which comprise the block copolymer are indicated by m and n. The residue of a multifunctional coupling agent, Y, enables the attachment of the arms to form a radial or star configuration.

The A segment of the block copolymer comprises a random copolymer of a monoalkenylarene and a conjugated diene. The term "random" means that the A segment comprises segments of monoalkenylarene and conjugated diene in no prescribed order. The number average molecular weight (Mn) of each A segment is preferably between about 5,000 and 200,000.

The B and C segments comprise either a homopolymer of a conjugated diene or a polymer of two or more conjugated dienes. The Mn of each B and C segment is preferably between about 5,000 and 200,000 and more preferably between about 10,000 and 100,000. The D segment comprises either a homopolymer of a monoalkenylarene or a copolymer of a monoalkenylarene and conjugated diene, and the molecular weight of D is preferably between about 5,000 and 100,000. The conjugated dienes in segments B, C, and D may be the same or different monomers.

In addition, the Tg of D is greater than the Tg of A. Preferably the D block has a Tg greater than 30° C., more preferably greater than 80° C. The Tg of A is preferably less than 30° C. The Tg of A is controlled by adjusting the ratio of monoalkenylarene and conjugated diene which comprise the A block.

The Tg of an endblock may be determined experimentally using differential scanning calorimetry (DSC) as measured by ASTM Test Method D3418-82 using a Perkin-Elmer 7 series thermal analysis system at a heating rate of 20° C./min. The Fox Equation may be used to predict the Tg of the endblock based on monomer feed ratios. The Fox Equation has the general form of:

$$1/T_g = \Sigma [M_i/T_{gi}]$$

where $M_i$ is the mass fraction of component i and $T_{gi}$ is the glass transition temperature of component i (L. H. Sperling, *Introduction of Physical Polymer Science*, John Wiley & Sons (1986). The Fox Equation assumes a single phase.

The monoalkenylarene useful in the present invention preferably has 8–18 carbon atoms within its molecular structure. Examples of useful monoalkenylarenes include styrene, alpha-methyl styrene, vinyltoluene, vinylpyridine, ethylstyrene, t-butylstyrene, isopropylstyrene, dimethylstyrene, and other alkylated styrenes as well as mixtures of the same. Styrene is the preferred monoalkenylarene. The conjugated diene useful in the present invention preferably has from 4 to 12 carbon atoms within its molecular structure. Examples of useful conjugated dienes include isoprene, butadiene, ethylbutadiene, phenylbutadiene, piperylene, dimethyl butadiene, hexadiene, ethylhexadiene, and mixtures of the same. Butadiene and isoprene are preferred conjugated dienes, and of the two, isoprene is most preferred.

The block copolymer may be prepared by conventional block copolymer anionic polymerization technology. The random copolymer endblock (A) may be made by contacting a monoalkenylarene with an initiator in the presence of an inert diluent and adding increments of a conjugated diene to form a living polymer having the simplified structure A--M, where A represents the essentially random copolymer and M represents a Group I metal such as Na, K and Li.

Organomonolithium compounds are useful initiators in the process described above. These compounds are represented by the structure RLi where R is an atiphatic, cycloaliphatic, or aromatic radical. Examples include ethyl lithium, n-propyl lithium, isopropyl lithium, n-butyl lithium, sec-butyl lithium, tertoctyl lithium, n-decyl lithium, phenyl lithium, 2-napthyl lithium, 4-butylphenyl lithium, 4-phenylbutyl lithium, cyclohexyl lithium, and the like. The inert diluent may be aromatic, naphthenic or paraffinic hydrocarbon. Specific examples of useful inert diluents include n-pentane, n-hexane, isooctane, cyclohexane, toluene, benzene, xylene and the like.

In this case where a block copolymer having the structure $(A-B)_m Y(C-D)_n$ is being formed, the living polymer A--M may be contacted with a conjugated diene to form living polymer having the general structure A--B--M. The living polymer is then coupled with arms (D--C--M) using a multifunctional coupling agent to form the linked block copolymer. Since this coupling reaction may not always go to completion, there may also be some unlinked diblock, (A--B) or (C--D), present in the polymer mass. The amount of unlinked diblock will vary with the coupling efficiency of the linking reaction.

The multifunctional coupling agents suitable for the invention may be any of the polyalkenyl coupling agents or other materials known to have functional groups which can react with carbanions of the living polymer to form linked polymers. Examples of suitable multifunctional coupling agents include silicon halides, polyepoxides, polyisocyanates, polyketones, polyanhydrides, dicarboxylic acid esters. Suitable polyalkenyl coupling agents may be aliphatic, aromatic or heterocyclic. Examples of aliphatic polyalkenyl coupling agents include the polyvinyl and polyalkyl acetylenes, diacetylenes, phosphates and phosphites, dimethacrylates such as ethylene dimethacrylate, and the like. Examples of suitable heterocyclic polyalkenyl coupling agents include divinyl pyridine, divinyl thiophene, and the like. Examples of suitable aromatic alkenyl coupling agents, which are preferred in the present invention, include polyvinyl benzene, polyvinyl toluene, polyvinyl xylene, polyvinyl anthracene, polyvinyl naphthalene, divinyl durene and the like. Suitable polyvinyl groups include divinyl, trivinyl and tetravinyl. Divinylbenzene (DVB) is the preferred coupling agent in the present invention, and may include o-divinylbenzene, m-divinylbenzene, p-divinylbenzene, and mixtures of the same.

The novel multi-arm block copolymer described above and having the general structure $(A-B)_m Y(C-D)_n$ is especially useful in providing a pressure sensitive adhesive. A related multi-arm elastomeric block copolymer having the general structure $(A'-B)_m Y$ is also useful in providing a pressure sensitive adhesive. In the $(A'-B)_m Y$ structure, A' and B are polymer segments as described above with reference to Formula I with the added proviso that the Tg of A' is less than 19° C. Y is a residue of a multifunctional coupling agent; and m is the number of arms and is at least three.

Various formulating ingredients are known for the preparation of adhesives from block copolymers of Formulae I and II. The formulating ingredients may include tackifying resins and plasticizers, which perform a variety of functions in the formulation of adhesives. The block copolymer itself is normally not sufficiently tacky to function as an adhesive. Thus, it is often necessary to add a tackifying resin or combination of resins to increase the tack. At least one tackifying resin must be compatible with the midblock of the block copolymer, but it may also be compatible with at least one of the endblock polymer segments. In the present invention, solid or hard tackifying resins that are compatible with the midblock are generally preferred.

Tackifiers or tackifying resins generally refer to materials which are miscible with the midblock in the block copolymer, have a number average molecular weight (Mn) of 10,000 grams per mol (g/mol) or less, a softening point above 70° C. as determined using a ring and ball apparatus, and a Tg of --30° C. or more as measured by differential scanning calorimetry (DSC). Suitable tackifying resins may include rosin and rosin derivatives, polyterpenes, coumarone indenes, hydrogenated resins and hydrocarbon resins, for example: alpha pinene-based resins, beta pinene-based resins, limonene-based resins, piperylene-based hydrocarbon resins, esters of rosins, polyterpene and aromatic modified polyterpene resins, aromatic modified piperylene-based hydrocarbon resins, aromatic modified dicyclopentadiene-based hydrocarbon resins and aromatic modified di-terpene and tri-terpene resins. Preferably a tackifying resin is present in the pressure sensitive adhesive of the present invention in an amount of from about 20 to about 300 (more preferably from about 50 to 200) parts by weight per 100 parts by weight of the block copolymer.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid rosin esters, liquid polystyrene resins and the like, elastomer oligomers, waxes, and mixtures of oils and hard tackifiers. A plasticizer may be present in the pressure sensitive adhesive of the present invention in an amount of from 0 to about 200 parts by weight per 100 parts by weight of the block copolymer.

The adhesive of the present invention may also be crosslinked. In general, crosslinking improves the solvent resistance and high temperature cohesive strength of the adhesive. Various crosslinking agents such as crosslinking promoters and reactive curatives may be employed to facilitate crosslinking of the adhesive. These agents are known to those of skill in the art and may be used in combination with heat, ultraviolet radiation or electron beam radiation to effectuate crosslinking. A crosslinking agent may be present in the pressure sensitive adhesive of the present invention in an amount of from 0 to about 50 parts by weight per 100 parts of copolymer.

The compositions of this invention may be modified with supplementary materials including pigments, fillers, and the like as well as stabilizers and oxidation inhibitors.

The adhesive compositions of the present invention may be applied to the substrate from a solution of up to about 40% weight solids of the ingredients in a solvent such as toluene, the solvent being removed by evaporation prior to crosslinking by exposure to the radiation. Alternatively, the ingredients may be mixed in a solvent, the mixture may be emulsified and the solvent evaporated, and the adhesive may be applied to the substrate as 50-60% weight solids water-based emulsion, the water being removed by evaporation prior to crosslinking. Adhesives of the present invention may also be applied to the substrate as 100% solids hot melt adhesives. For example, an extruder may be used to mix the adhesive, feed a coating die and apply the adhesive to the substrate.

A preferred use of the pressure-sensitive adhesive of the invention is in the preparation of a novel pressure-sensitive tape. The tape comprises a layer of the adhesive composition of the present invention coated on at least a portion of at least one major surface of a carrier. The carrier may be a plastic film, paper, foamed polymer or any other suitable material, and the tape may include various other layers or coatings, such as primers, release coatings and the like, which are used in the manufacture of pressure-sensitive adhesive tapes.

EXAMPLE 1

A star block copolymer having the general structure $(A-B)_m Y(C-D)_n$ was prepared. The A block of the star block copolymer of this example comprised a copolymer of styrene and isoprene, while the B and C blocks comprised homopolymers of polyisoprene, and the D block comprised a homopolymer of polystyrene. The star block copolymer was prepared as follows:

Reactor 1 was charged with dry cyclohexane (100 ml), sec-butyllithium (0.24 mmol) and purified styrene (6.0 g) under argon protection using a syringe. The polymerization of the living styrene endblock was allowed to proceed at 40° C. for at least one hour to achieve a molecular weight of 25,000 g/mol. Reactor 2 was charged with dry cyclohexane (300 ml) and sec-butyllithium (0.97 mmol). Purified styrene (8.4 g) was added to reactor 2, followed by incremental introduction of isoprene (20.7 g) to form living styrene-isoprene random copolymer endblock. The contents in the reactor 2 were allowed to polymerize for a minimum of one hour at 50°–60° C. after the last charge of the monomers. Reactor 3 was charged with dry cyclohexane (1500 ml) and purified isoprene (84.9 g). The living styrene endblock solution in reactor 1 and the styrene/isoprene copolymer endblock solution in reactor 2 were then transferred into polymerization reactor 3 through a cannula under argon protection. The polyisoprene midblock was then allowed to polymerize for a minimum of two hours at 50°–60° C. The living diblock copolymer arms thus formed were linked to a star structure through a coupling reaction with dry divinylbenzene (DVB, 12.1 mmol). A bright dark red color developed after the addition of DVB. The coupling reaction was allowed to complete at 50°–60° C. for 12 hours. The reaction was terminated with 1 ml isopropanol (previously purged with argon) followed by the addition of 1–2% (based on polymer weight)octadecyl-3, 5-di-tert-butyl-4-hydroxyhydrocinnamate (Irganox™1076) antioxidant. The star block copolymer was precipitated into isopropanol and dried in a vacuum oven at 50° C. for three days.

The Mn of the endblock, diblock and star block copolymers were determined as follows:

The endblock, diblock and star block copolymers were characterized using a Hewlett-Packard Model 1082B size exclusion chromatograph equipped with two bimedal Zorbax PSM Kits (two columns at 60-S Å and two columns at 1000-S Å). Individual endblock, diblock and star block copolymer samples were dissolved in filtered, AR grade tetrahydrofuran (available from Mallinckrodt Chemical Co., Paris, Ky.) and passed through columns at a rate of 0.5 ml per minute at 40° C. The refractive indices of the samples were measured using a Hewlett-Packard Model 1037A differential refractometer detector and compared against the calibration curves obtained using polystyrene standards. All molecular weight averages are polystyrene equivalent molecular weights and are summarized in Table 1. The average number of arms on each star was calculated directly from the SEC measurements without considering any branching factor, and these also are summarized in Table 1.

The Tg in °C. of the midblocks and endblocks were measured by differential scanning calorimetry (DSC) according to ASTM Test Method D3418-82 using a Perkin-Elmer 7 series thermal analysis system at a heating rate of 20° C./min. The measured values are included in Table 1. The Fox Equation was also used to calculate the theoretical Tg of each endblock based on monomer feed ratios. In this calculation, a Tg of 373° K. was used for polystyrene and a Tg of 213° K. was used for polyisoprene. The calculated values are included in parentheses in Table 1.

TABLE 1

| Polymer # | Mn × 10⁻³ ⁽ᵃ⁾ S/I | S | (S/I)-I | Star | # of Arms⁽ᵇ⁾ | $T_g$ (°C.)⁽ᶜ⁾ Mid-Block | Endblock S/I | S |
|---|---|---|---|---|---|---|---|---|
| 1 | 39 | 35 | 237 | 1,613 | 7 | −59 | −21(−30) | 92(100) |

⁽ᵃ⁾Measured by SEC using polystyrene standards.
⁽ᵇ⁾Calculated from SEC measurements, not considering the branching factor.
⁽ᶜ⁾Measured by DSC and the values in parentheses were calculated using Fox equation.

EXAMPLE 2

Five separate star block copolymers were prepared. Three of the five star block copolymers illustrate the invention while two of them are for comparative purposes. All five star block copolymers of this example have the general structure $(A'-B)_n Y$ wherein block A' comprises a copolymer of styrene and isoprene and block B comprises a homopolymer of isoprene. The block copolymers were prepared as follows:

Polymerization reactions were conducted in single neck round bottom flasks equipped with Rotoflo™ stopcocks and magnetic stirring bars. All transfers of solvents, monomers and coupling agents into the flasks were conducted through the stopcock either under high vacuum conditions or argon atmosphere.

A first reactor vessel was charged with dry Analytical Reagent (AR) grade cyclohexane (available from Mallinckrodt Chemicals Co., Paris, Ky.). Next, 12 wt % sec-butyllithium in cyclohexane (available from Lithium Corporation of America, Bemmemer City, N.C.) was added to the vessel. Following that addition, 99% pure styrene (available from Aldrich Chemical Company, Milwaukee, Wis.) was added to the vessel. 99% pure isoprene (available from Goodyear Tire & Rubber Co., Akron, Ohio) was then added to the vessel in 3–5 ml increments. All quantities of the above-mentioned chemicals are given in Table 2.

TABLE 2

| Polymer # | End Block | | | | | Star Copolymer | |
|---|---|---|---|---|---|---|---|
| | Sec-BuLi (mmole) | Cyclohexane (ml) | Styrene (g) | Isoprene (g) | S/I | Isoprene (g) | Cyclohexane (ml) |
| 2 | 1.2 | 400 | 8.7 | 21.3 | 29/71 | 70 | 1600 |
| 3 | 1.0 | 250 | 15.5 | 12.9 | 54/46 | 70 | 1500 |
| 4 | 1.0 | 200 | 9.6 | 5.4 | 64/36 | 85 | 1500 |
| Comparative 1 | 1.0 | 200 | 10.5 | 4.5 | 70/30 | 88 | 1300 |
| Comparative 2 | 1.0 | 200 | 12.0 | 3.0 | 80/20 | 85 | 1500 |

After the last addition of isoprene, the contents of the reaction vessel were allowed to polymerize at 50°–60° C. (122°–140° F.) for a minimum of one hour to form a random styrene/isoprene [S/I] copolymer endblock. The resulting living styrene-isoprene endblock solution was then transferred through a cannula, under argon atmosphere, into a second reactor vessel charged with dry AR grade cyclohexane and 99% pure isoprene as indicated in Table 1. The contents were allowed to polymerize for a minimum of two hours at 50°–60° C. (122°–140° F.) to form a styrene/isoprene-isoprene [(S/I)-I] diblock copolymer. 1.3 grams of dry divinylbenzene (DVB) (available from Dow Chemical Company, Midland, Mich.) was then added to the vessel and allowed to react for about 12 hours at 50°–60° C. (131°–149° F.) to link the living diblock arms into a star structure. A few drops of AR grade isopropyl alcohol (available from Mallinckrodt Chemicals Co., Paris, Ky.) were introduced into the reactor vessel to terminate the reaction, and 1–2% (based on polymer weight) of Irganox™ 1076 antioxidant (octadecyl-3,5,-di-tert-butyl-4-hydroxyhydrocinnamate, available from Ciba-Geigy Corp., Hawthorne, N.Y.), was added to stabilize the polymer. The star block copolymer was precipitated into AR grade isopropanol and dried in a vacuum oven at 50° C. for three days.

The Mn of the endblock (S/I), diblock ((S/I)-I) and star block copolymer were determined as described in Example 1 and are given in Table 3. The average number of arms and the Tg of the midblocks and endblocks were also determined as in Example 1 and are given in Table 3.

TABLE 3

| Polymer # | Mn × 10$^{-3(a)}$ | | | # Arms$^{(b)}$ | Tg (°C.)$^{(c)}$ | |
|---|---|---|---|---|---|---|
| | S/I | (S/I)-I | Star | | Mid-Block | End-Block |
| 2 | 44 | 131 | 1,242 | 10 | −59 | −35 (−30) |
| 3 | 42 | 170 | 1,089 | 6 | −59 | −1 (4) |
| 4 | 22 | 107 | 997 | 9 | −60 | d (20) |
| Comparative 1 | 24 | 145 | 1,111 | 7 | −60 | d (30) |
| Comparative 2 | 20 | 116 | 897 | 8 | −61 | 49 (50) |

$^{(a)}$Measured by SEC using polystyrene standards
$^{(b)}$Calculated from SEC measurements, not considering the branching factor
$^{(c)}$Measured by DSC and the values in parentheses were calculated using Fox equation
$^{(d)}$Not detectable by DSC

EXAMPLE 3

A star block copolymer having the general structure (A'–B)$_m$Y wherein block A' comprises styrene and block B comprises isoprene was prepared for comparative purposes. The block copolymer was prepared as follows:

Reactor 1 was charged with dry cyclohexane (200 ml), sec-butyllithium (1.0 mmol) and purified styrene (12.0 g) under argon protection using a syringe. The polymerization of the living styrene end block was allowed to complete at 40° C. for a minimum of one hour. Reactor 2 was charged with dry cyclohexane (1500 ml) and purified isoprene (100 g). The living styrene endblock in Reactor 1 was then transferred into polymerization Reactor 2 through a cannula under argon protection. The polyisoprene midblock was allowed to polymerize for a minimum of two hours at 50°–60° C. The living diblock copolymer arms thus formed were linked to a star structure through a coupling reaction with divinylbenzene (DVB, 12.1 mmol). A bright dark red color developed after the addition of DVB. The coupling reaction was allowed to complete at 50°–60° C. for 12 hours. The reaction was terminated with 1 ml isopropanol, previously purged with argon, followed by the addition of 1–2% (based on polymer weight) octadecyl-3, 5-di-tert-butyl-4-hydroxyhydro-cinnamate (Irganox™ 1076) antioxidant. The star block copolymer was precipitated into isopropanol and dried in a vacuum oven for three days.

The Mn of the endblock was determined as in Example 1 and is given in Table 4. The design targets for the Mn of the diblock and star as well as the number of arms are also given in Table 4. The Tg of the midblock and endblock are also given in Table 4.

TABLE 4

| Polymer # | Mn × 10$^{-3(a)}$ | | | # Arms$^{(b)}$ | Tg (°C.)$^{(c)}$ | |
|---|---|---|---|---|---|---|
| | End-Block | Di-Block | Star | | Mid-Block | End-Block |
| Comparative 3 | 13 | 140 | 1,109 | 8 | −64 | 92 |

$^{(a)}$Measured by SEC using polystyrene standards.
$^{(b)}$Calculated from SEC measurements, not considering the branching factor.
$^{(c)}$Measured by DSC.

EXAMPLE 4

Each of the star block copolymers described in Examples 1–3 above was formulated into different adhesive compositions.

The block copolymers were combined with Wingtack™ Extra tackifier resin, a C$_5$ hydrocarbon modified with alpha methyl styrene (available from Goodyear Tire & Rubber Co., Chicago, Ill.) and Zonarez™ A-25, a low molecular weight alpha pinene resin having a ring and ball softening point of 25° C. (available from Arizona Chemical Co., Panama City, Fla.). The amount of each resin component used in the adhesive formulations is given in Table 5 as parts by weight per 100 parts block copolymer (pph).

The resulting compositions were weighed dry and dissolved in toluene to give 35% solids by weight solution. The solutions were separately knife coated onto 38.1 micrometer (1.5 mil) thick biaxially oriented polyethylene terephthalate (PET) film at a coating weight of 41.94 g/m$^2$ (10 grains/24 in$^2$). The coatings were dried for three minutes at room temperature (22° C. or 72° F.), followed by 2 minutes at 180° F. (82° C.) in a convection oven. The coatings were then removed from the oven and covered with a silicone coated release liner. Two samples of each formulation were made, and one sample of each was irradiated with electron beam radiation using an Electrocurtain CB-300 electron beam system (available from Energy Sciences, Inc., Wilmington, Mass.). Before irradiation, the liner was removed, and the adhesive was irradiated at 125 kV at a dose of 6 MRads. The liner was then replaced. The low stress peel properties of each adhesive formulation were then measured. These measurements were conducted in a controlled environment testing room maintained at 70° F. (21° C.) and 50% relative humidity.

washed 101.6 mm (4 inch) brightly annealed, highly polished 304 stainless steel test panel using four passes of a 2 kg (4.5 lb) rubber-faced roller. A static load of 200 grams was attached to the tape at an angle of 90 degrees, and the time it took for the load to drop was measured in minutes. The test results given in Table 5 represent the average of two duplicate tests.

The mode of failure for each the peel adhesion and resistance to low stress peel test are also indicated in Table 5 for each tape. "C" indicates cohesive failure, meaning that the adhesive left a visible residue on the test panel substrate. "A" indicates adhesive failure wherein the adhesive left no visible residue on the test panel substrate. "I" indicates adhesive failure at the adhesive/backing interface wherein the adhesive pulled away from the backing and remained on the test panel. "X" indicates that the value was extrapolated.

TABLE 5

| Polymer # | Backing Type | Dose Mrads | Wingtack™ (pph) | Zonarez™ (pph) | Adhesion oz./in. | Adhesion N/m | Adhesion Failure Mode | Low Stress Peel Min. | Low Stress Peel Failure Mode |
|---|---|---|---|---|---|---|---|---|---|
| 1 | PET | 0 | 33.3 | 33.3 | 34.0 | 372.3 | A | 350 | C |
| 1 | PET | 0 | 50 | 50 | 65.0 | 711.8 | A | 271 | C |
| 1 | PET | 6 | 33.3 | 33.3 | 30.0 | 328.5 | A | 13,333 | A,X |
| 1 | PET | 6 | 50 | 50 | 47.0 | 514.7 | A | 13,333 | A,X |
| 2 | PET | 0 | 33.3 | 33.3 | —** | —** | C | 12 | C |
| 2 | PET | 0 | 50 | 50 | —** | —** | C | 5 | C |
| 2 | PET | 6 | 33.3 | 33.3 | 37.0 | 405.2 | A | 6,200 | A |
| 2 | PET | 6 | 50 | 50 | 55.0 | 602.3 | A | 25,000 | I,X |
| 3 | PET | 0 | 33.3 | 33.3 | 33.4 | 366.2 | A | 101 | C |
| 3 | PET | 0 | 50 | 50 | —** | —** | C | 101 | C |
| 3 | PET | 6 | 33.3 | 33.3 | 42.6 | 466.0 | A | 2.8* | |
| 3 | PET | 6 | 50 | 50 | 55.7 | 609.7 | A | 4,890 | A |
| 4 | PET | 0 | 33.3 | 33.3 | 58.7 | 643.0 | A | 499 | C |
| 4 | PET | 0 | 50 | 50 | 62.4 | 683.3 | A | 400 | C |
| 4 | PET | 6 | 33.3 | 33.3 | 53.1 | 581.7 | A | 20,000 | A,X |
| 4 | PET | 6 | 50 | 50 | 72 | 788.4 | A | 30,000 | C,X |
| Comparative 1 | PET | 0 | 33.3 | 33.3 | 37.9 | 415.2 | A | 8.8 | A |
| Comparative 1 | PET | 0 | 50 | 50 | 56.0 | 613.2 | A | 395 | A |
| Comparative 1 | PET | 6 | 33.3 | 33.3 | 41.6 | 455.5 | A | 1.3 | A |
| Comparative 1 | PET | 6 | 50 | 50 | 49.6 | 543.1 | A | 8.8 | A |
| Comparative 2 | PET | 0 | 33.3 | 33.3 | 40.0 | 438.0 | A | 6.3 | A |
| Comparative 2 | PET | 0 | 50 | 50 | 41.6 | 455.5 | A | 6.9 | A |
| Comparative 2 | PET | 6 | 33.3 | 33.3 | 40.0 | 438.0 | A | 1.6 | A |
| Comparative 2 | PET | 6 | 50 | 50 | 48.0 | 525.6 | A | 8.8 | A |
| Comparative 3 | PET | 0 | 33.3 | 33.3 | 23.0 | 251.9 | A | 2 | A |
| Comparative 3 | PET | 0 | 50 | 50 | 24.0 | 262.8 | A | 2 | A |
| Comparative 3 | PET | 6 | 33.3 | 33.3 | 36.0 | 394.2 | A | 4 | A |
| Comparative 3 | PET | 6 | 50 | 50 | 48.0 | 525.6 | A | 6 | A |

A = adhesive failure mode
I = failure adhesive/backing interface
C = cohesive failure mode
X = extrapolated
* = adhesive didn't form bond in time frame of test; when allowed to dwell 18 hours, then 75,000 minutes.
** = no adhesion value reported, since failure mode was cohesive.

To measure adhesion, the tapes were conditioned in the controlled environment for 24 hours and analyzed on a Sintech 6 computerized system for material testing, according to standard tape method PSTC-1, Peel Adhesion for Single Coated Tapes 180° Angle. The tape was removed at an angle of 180 degrees at a rate of 30.5 cm/min (12 in/min). A load cell linked to a computer was used to estimate the value reported in Table 5.

To measure resistance to low stress peel, 19.05 mm (0.75 inch) by 101.6 mm (4 inch) samples of each tape were conditioned for 24 hours in a controlled environment. After conditioning, a sample was applied to a diacetone alcohol

RESULTS

One of the primary goals of this series of experiments was to identify a pressure sensitive adhesive tape having a sufficient balance of adhesion and resistance to low stress peel. Only tapes of the present invention (made from polymers 1–5) showed both high resistance to low stress peel while maintaining moderate adhesion. None of the comparatives, on the other hand, showed acceptable resistance to low stress peel.

Figure 2:
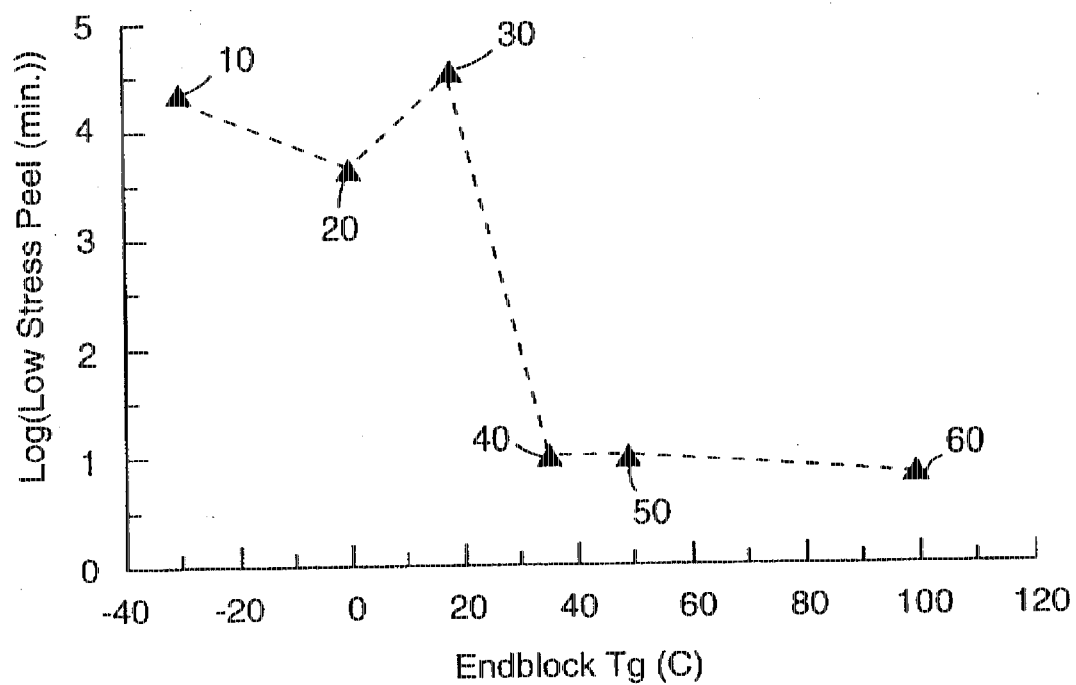
FIG. 2 is a plot of the Log of Low Stress Peel versus Endblock Tg of the multi-arm block copolymer.

Applicants have discovered that this balance of properties is achieved by controlling the Tg of the endblock of the block copolymer to a sufficiently low level. This is further illustrated in FIGS. 1 and 2 which show Peel Adhesion and the Log of Low Stress Peel as a function of Endblock Tg respectively. The graphs plot adhesion and low stress peel values for adhesives prepared from polymers 2, 3, 4, comparative 1, comparative 2 and comparative 3. Polymers 2, 3 and 4 each of have an endblock Tg of less than room temperature. The comparative polymers each have an endblock Tg of greater than room temperature. Each of the adhesive compositions consisted of 100 parts by weight of the polymer, 50 parts by weight of Wingtack™ Extra and 50 parts by weight Zonarez™ A-25. The compositions were applied to a biaxially oriented PET backing, dried and irradiated as described above in this Example 4. In the Figures, reference numerals 10, 20, 30, 40, 50 and 60 refer to adhesives employing polymers 2, 3, 4, comparative 1, comparative 2 and comparative 3 respectively.

The figures show that tapes made from polymer having endblock Tg values less than room temperature exhibit acceptable resistance to low stress peel values while maintaining moderate adhesion. Above an endblock Tg value of 30° C., the balance of properties is lost as the resistance to low stress peel drops off markedly. Accordingly, the adhesive of the present invention, and tape made from it, (1) resist lifting under light loads and (2) maintain moderate peel adhesion thereby remaining easy to remove.

We claim:

1. A pressure sensitive adhesive composition, comprising:
   (a) 100 parts by weight of a multi-arm elastomeric block copolymer having the general structure $(A'-B)_m Y$ wherein A' and B are polymer segments; Y is a residue of a multifunctional coupling agent; m is the number of arms and is at least three; A comprises a random copolymer of a monoalkenylarene and a conjugated diene, wherein the Tg of A is less than 19° C.; and B comprises either a homopolymer of a conjugated diene or a polymer of two or more conjugated dienes;
   (b) about 20 to about 300 parts by weight of a tackifying resin;
   (c) 0 to about 50 parts by weight of a crosslinking agent; and
   (d) 0 to about 200 parts of a plasticizer.

2. A pressure-sensitive adhesive according to claim 1, wherein A' comprises a copolymer of styrene and isoprene and B comprises a homopolymer of isoprene or butadiene or copolymer thereof.

3. A pressure-sensitive adhesive according to claim 1 wherein the adhesive composition is crosslinked.

4. A film of a pressure sensitive adhesive according to claim 1.

5. A tape comprising a pressure sensitive adhesive composition according to claim 1.

6. A tape according to claim 5 wherein said pressure-sensitive adhesive composition is crosslinked.

7. A tape according to claim 5 wherein said adhesive is provided as a layer on a carrier.

8. A tape according to claim 7 wherein said carrier comprises paper.

9. A tape according to claim 7 wherein said carrier comprises a polymeric material.

10. A tape according to claim 7 wherein said carrier comprises a release surface.

11. A tape according to claim 9 wherein said polymeric material is foamed.

12. A tape according to claim 5 wherein said adhesive composition is provided as a layer on opposite surfaces of the carrier.

* * * * *